DEMODULATION APPARATUS FOR PULSE MULTIPLEX PULSE TIME MODULATED SIGNALS

Filed Sept. 15, 1945

INVENTOR.
ALBERT M. SKELLETT
BY HIS ATTORNEY
J. F. Clark

Patented Dec. 12, 1950 2,533,405

UNITED STATES PATENT OFFICE 2,533,405

DEMODULATION APPARATUS FOR PULSE MULTIPLEX PULSE TIME MODULATED SIGNALS

Albert M. Skellett, Madison, N. J., assignor to National Union Radio Corporation, Newark, N. J., a corporation of Delaware Application September 15, 1945, Serial No. 616,508

7 Claims. (Cl. 179—15)

Figure 1:
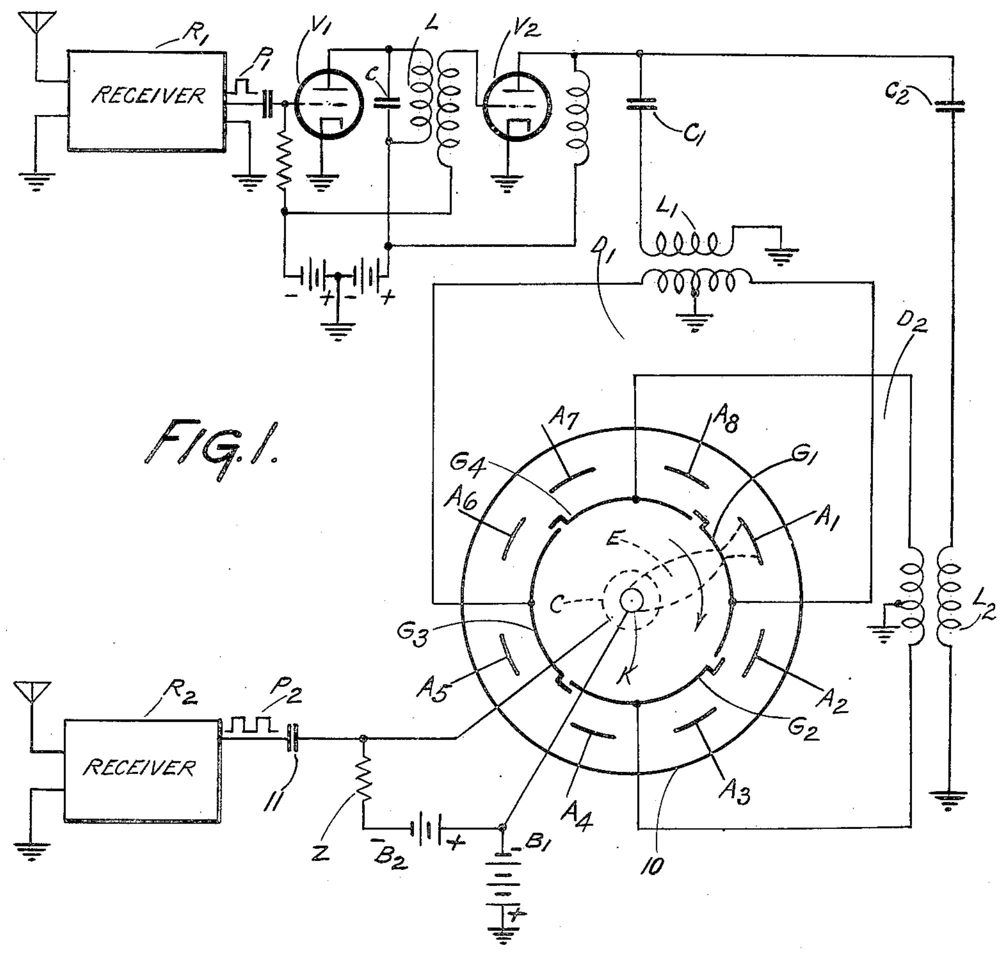

This invention relates to multiplex systems of the "pulse time modulation" type. Specifically, it provides a means for simultaneously detecting in a single vacuum tube a number of multiplexed signals of this type.

Pulse time modulation refers to a means of communication, usually by radio, in which information is sent by means of recurring pulses of energy the time occurrence of the pulses being varied to provide the required signal. A multiplex system, according to my invention might provide a number of communication channels, each of which is transmitted on a series of pulses. The pulses of one or more additional series of pulses, representing different communication channels may be interspersed between the pulses of the first channel. These pulses are sent out cyclically over and over and the time position of each pulse in each cycle is varied in accordance with the signal information. One cycle of pulse would consist of one pulse for each channel, the cycle recommencing when the next pulse in the first channel occurs. If desired, one channel may be used for synchronization and the others are available for communication purposes.

One object of my invention is to provide a simple detector useful for detecting pulse time modulation, sometimes known as pulse position modulation, said detector being usable to detect frequency or phase modulation as well.

Another object of my invention is to provide a detector of any of the above types of modulation, adapted to be used, if desired, with a synchronizing signal, as in television or in a multiplexing system as above defined.

A further object of my invention is to provide a combination detecting device adapted to demodulate position, frequency or amplitude modulated signals as desired.

Still a further object of my invention is to provide a multiplex signal distributing device based on electronic principles which will have no parts which involve mechanical contacts or motions during operation.

Figure 2:
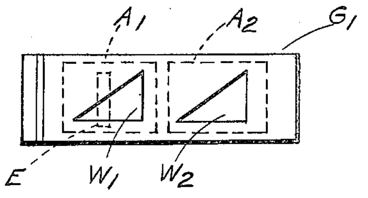

A simplified specific embodiment of my invention is shown in the drawing, in which:

Fig. 1 is a diagrammatic view of a complete multiplex signal receiving system; and Fig. 2 is a detail of a screen plate used in the multiple detector.

Referring to the drawings, Fig. 1 shows in schematic form the essential elements of a multiplex pulse signal receiver according to my invention. The characteristic feature of the receiver is a radial beam tube 10 in which there is a single electron beam E which is made to revolve at the cyclic frequency of the pulse transmission. This may be accomplished as shown in Fig. 1 by the use of a separate receiver $R_1$ and associated circuits, which discriminate against the pulses used for communication in favor of the synchronizing pulse. For example, the synchronizing pulse may be of a different radio frequency than the others. From the receiver $R_1$, tuned to receive the synchronizing pulses, there is obtained a series of uniformly spaced rectified pulses $P_1$ as shown diagrammatically above the lead from the receiver. These pulses drive the tuned circuit LC in the plate lead of the vacuum tube $V_1$ which tube is supplied with the rectified pulses $P_1$. The circuit LC is tuned to the cyclic frequency of the pulses $P_1$. Buffer amplifier stage $V_2$ passes the cyclic frequency of the pulses $P_1$ to the two phase-splitting deflecting circuits $D_1$ and $D_2$ from which the two-phase electrostatic potentials are derived for driving the radial beam E in a rotary manner.

It is by reason of these two-phase potentials that the electrostatic deflecting field in the tube 10 revolves at the cyclic frequency of the pulses $P_1$.

The screen elements of the radial beam tube 10 may be divided into four segments $G_1$, $G_2$, $G_3$ and $G_4$ as shown and each segment may have two triangular windows $W_1$ and $W_2$ which are shown in Fig. 2 of the drawing, which is a developed view of one of the screen segments $G_1$. In back of each triangular window $W_1$ and $W_2$ (and the corresponding windows in the segments $G_2$, $G_3$ and $G_4$), there is an anode, $A_1$ or $A_2$, from which is derived the demodulated signal corresponding to its channel. These signals are demodulated in the manner described below and are applied to utilization apparatus of the appropriate standard type, not shown. The tube 10 is provided with a cathode K and with a control electrode C surrounding the cathode. The signal receiver $R_2$ is similar to the receiver $R_1$, but may be tuned to a different frequency. It supplies demodulated pulses $P_2$ through the grid condenser 11 to the control electrode C. Battery $B_1$ provides the correct D. C. potential to energize the anodes A and the screens G with respect to the cathode and to focus the beam. Battery $B_2$ establishes the appropriate potentials between cathode K and control electrode C through impedance Z. Of course any other appropriate sources of potential may be used. For a detailed disclosure of the manner in which the beam is focussed reference may be had to U. S. Patent #2,433,403.

At the start of a cycle, the synchronizing pulse $P_1$ energizes the circuit LC to restore to it the energy which it lost during the previous cycle and to correct its phase so as to maintain the synchronization of the rotating field in the radial beam tube. The electrostatic field revolves continuously and operates to focus any available electrons on the appropriate opening W, say $W_1$, in the screen G. However, because of the provision of negative bias on the grid C the electron beam E is present only during those times when a signal pulse $P_2$ is being received. The shape of the intersection of the electron beam and a screen plate may be a narrow rectangle as shown dotted in Fig. 2 because it is the image of the cathode K. Because of the triangular shape of the window W, a variation in the timing of the pulse about its average central position will cause a variation in the amplitude of the current received by the anode A and thus the signal is demodulated.

In a succeeding part of the cycle the electrostatic field is in position to focus the beam E on window $W_2$ and when this time arrives the corresponding pulse $P_2$ will be received by the signal receiver $R_2$ and will, through the corresponding positive pulse on the grid C, energize the beam E to produce a pulse of current, to anode $A_2$ whose amplitude corresponds to the signal modulation carried by the pulse. The rest of the pulses in the cycle are directed in a similar manner to the appropriate anodes in the tube. Thus the electrostatic field which rotates the electron beam E is maintained in synchronism with the cyclic frequency of the pulse transmission by means of the synchronizing pulses $P_1$, and time variations in the positions of the pulses $P_2$ in the cycle are converted to amplitude variations in the pulses that come from the anodes A of the tube. Smoothing circuits following each anode A may be used in the usual manner to convert these amplitudes modulated pulses into the reproduction of the original signal.

It is known that in the electrostatically focused radial beam tube the width of the beam E varies slightly as it revolves. Such variations may be compensated for by modifying the shape of the windows W from the triangular form shown, or in any other suitable manner.

Although a two-phase tube has been described it is manifest that a larger number of phases could equally well be used by the addition of more phase-splitting circuits D connected to the plate circuit of the tube $V_2$ and by correspondingly increasing the number of screen elements G.

It is also evident that at low cyclic frequencies of the pulses $P_1$, a magnetically focused radial beam tube could be used in place of the electrostatic focused radial beam tube 10. For a detailed description of such magnetically focussed radial beam tube reference may be had to Journal of Applied Physics, volume 15, No. 10, pages 704–709, October 1944.

As stated above there are other types of multiplex pulse transmission to which this invention might be applied. For example, for frequency, phase, or amplitude modulated pulses (instead of time modulated as described above) the same arrangement could be used to distribute the incoming pulses to their respective channels. The system would be operative without modification for any type of rate modulation, including phase and frequency modulation.

While the simplest embodiment of the detecting device 10 has been illustrated, it is not necessary to provide triangular windows but only to provide the effect of triangular windows. Anything which produces this effect will be satisfactory for the purpose.

For the purposes of clarity the windows have been illustrated as being openings in a conducting sheet. It is preferable, however, to cover the windows with conducting screen material held at the same potential as the conducting portions G so that the electric field is more uniform and the beam is not defocused. The other established practices in the art, such as the use of suppressor grids of focusing electrodes operating in the space between the screen G and the anodes A may be adopted as desired.

The detector 10 may be connected to separate channels as described with reference to Fig. 1, or alternatively, the anodes may be connected in pairs or larger groups, or alternate anodes may be connected together in groups. The arrangement of connections will depend on the nature of the signal which it is desired to obtain from this device.

With reference to the nature of the synchronizing pulse in the simplest embodiment, these pulses would normally be uniform in time, shape, and amplitude. However, it is unnecessary that the amplitude be held at a fixed level as long as there is sufficient synchronizing signal present to produce the required result. For this reason, the synchronizing signal may be amplitude modulated to a moderate extent if desired. The resulting amplitude modulated signal is available at the output of tube $V_2$ for demodulation.

The load circuit of the tube $V_2$ consists primarily of the two deflecting systems $D_1$ and $D_2$. Deflecting system $D_1$ is supplied by a path including capacitor $C_1$ and inductor $L_1$, and deflecting system $D_2$ is supplied through capacitor $C_2$ and inductor $L_2$. The resonant frequencies of circuits $C_1L_1$ and $C_2L_2$ are preferably adjusted so that the deflecting voltages are 90° out of phase. However, any other suitable circuit may be used, as it is only necessary that the effects of the deflecting systems $D_1$ and $D_2$ be applied to the screens G 90° out of phase with each other, as is well known. By inserting reactors and resistors in appropriate places in this circuit, as for example, in the load circuit of tube $V_1$ or in shunt or in series with the deflecting systems $D_1$, $D_2$, the phase of the synchronizing signal with respect to the signal being received by receiver $R_2$ may be adjusted. By this adjustment differences in phase due to the use of two different receivers may be overcome or an arbitrary phase relation may be established.

Having described one embodiment of my invention with particularity, the manner in which the aforesaid objects and advantages are realized will be evident. However, it will be understood that such changes and modifications may be made, in the illustrated embodiment, as may come within the scope of the appended claims.

I claim:

1. Electron discharge apparatus particularly for the demodulation of received pulse time-modulated signals, comprising an enclosing envelope having an electron emitter, electron collector means surrounding said emitter, a plurality of demodulation electrode members surrounding said emitter each demodulation member also acting as a beam focussing electrode, a control electrode located between said emitter and said demodulation electrode members, means to bias said members with respect to said cathode to form the electrons into a substantially focussed beam on said members, means to apply phased displaced alternating voltages to said members to cause the beam to rotate synchronously around said emitter, each of said members having at least one electron permeable window for allowing the electron beam to pass therethrough to a corresponding one of said collector means, each window being located in the path of the focussed beam and having a configuration which produces a variable intercept area with the beam as it rotates past said window, and means to apply received time modulation pulses to said control grid to produce at said collector electrodes a current which is a function of the rate of the beam rotation and the timing of the received modulated signals applied to said control grid.

2. Electron discharge apparatus according to claim 1 in which said collector means, comprises a plurality of discrete anodes in respective radial alignment with said windows each anode serving as an individual output anode for a particular pulse time-modulation channel.

3. Apparatus for channelizing and demodulating received multiplex signals of the pulse-time modulation type wherein the pulses are of equal duration but of variable time position representing the original signal modulations, said apparatus comprising, a single vacuum tube having an electron-emitting cathode, a plurality of electron collector electrodes each connected to a corresponding multiplex channel, a pulse time-to-amplitude demodulation electrode located between said cathode and said collector electrodes, said demodulator electrode having a series of electron permeable windows each allotted to a corresponding one of said collector electrodes, means including said demodulator electrode to focus the electrons from said cathode into a beam and also to move said beam successively past each of said windows, a control electrode for said beam to produce an intercept between the beam and each window the area of which intercept is proportional to the said time modulation, and means to apply the received time-modulated pulses to said control electrode in synchronized relation to the movement of said beam past said windows to cause said collector electrodes to receive a variable quantity of electrons from the beam and thereby to convert the pulse-time modulations directly into amplitude demodulations for application to the respective multiplex channels.

4. Apparatus according to claim 3 in which said beam has a substantially fixed width at the region where it passes said openings, which width is very much smaller than the dimension of each of said openings considered in the direction of the beam rotation.

5. Apparatus according to claim 3 in which said demodulation electrode comprises a series of separate electrode plates coaxially surrounding said cathode, said plates being connected to a source of phase-displaced voltages to cause said plates to act as beam-focussing electrodes for focussing the beam approximately at said windows.

6. Apparatus according to claim 5 in which each of said windows is covered with a conducting screen for maintaining the electric field in each window uniform and for maintaining the beam in a focussed condition at said window.

7. Apparatus according to claim 1 in which said windows are triangular and said beam is focussed on said demodulation electrode members as a substantially rectangular spot.

ALBERT M. SKELLETT.

REFERENCES CITED

The following references are of record in the file of this patent:

UNITED STATES PATENTS

| Number | Name | Date |
|---|---|---|
| 1,757,345 | Strobel | May 6, 1930 |
| 2,110,548 | Finch | Mar. 8, 1938 |
| 2,144,337 | Koch | Jan. 17, 1939 |
| 2,185,693 | Mertz | Jan. 2, 1940 |
| 2,189,898 | Hartley | Feb. 13, 1940 |
| 2,217,774 | Skellett | Oct. 15, 1940 |
| 2,221,744 | Henry | Nov. 12, 1940 |
| 2,250,528 | Gray | July 29, 1941 |
| 2,256,336 | Beatty | Sept. 16, 1941 |
| 2,257,795 | Gray | Oct. 7, 1941 |
| 2,265,216 | Wolf | Dec. 9, 1941 |
| 2,308,639 | Beatty et al. | Jan. 19, 1943 |
| 2,391,967 | Hecht et al. | Jan. 1, 1946 |
| 2,438,928 | Labin | Apr. 6, 1948 |
| 2,465,380 | Labin et al. | Mar. 29, 1949 |

FOREIGN PATENTS

| Number | Country | Date |
|---|---|---|
| 590,463 | Great Britain | July 18, 1947 |
| 647,468 | Germany | July 5, 1937 |